United States Patent [19]

Minhas et al.

[11] 4,116,931

[45] Sep. 26, 1978

[54] FLAME RETARDANT FIBERS, CARPETS AND MOLDING COMPOUNDS AND METHODS OF MAKING SAME

[75] Inventors: Pritam S. Minhas, Mendham, N.J.; Bernard Sukornick, Williamsville, N.Y.

[73] Assignee: Allied Chemical Corporation, Morris Township, Morris County, N.J.

[21] Appl. No.: 861,779

[22] Filed: Dec. 19, 1977

[51] Int. Cl.$^2$ ............................................. C08K 5/09
[52] U.S. Cl. .................. 260/45.75 B; 260/45.7 R; 260/45.85 B; 260/45.85 T; 428/97; 428/921
[58] Field of Search .................. 260/45.7 R, 45.75 B, 260/45.85 T, 45.85 B; 428/97, 921

[56] References Cited

U.S. PATENT DOCUMENTS

| | | | |
|---|---|---|---|
| 3,943,100 | 3/1976 | Berenbaum et al. | 260/45.85 T |
| 3,956,236 | 5/1976 | Evans et al. | 260/45.85 T |
| 4,061,810 | 12/1977 | Minhas et al. | 428/921 |
| 4,064,298 | 12/1977 | Schwartz et al. | 260/45.75 W |

Primary Examiner—V. P. Hoke
Attorney, Agent, or Firm—Alan M. Doernberg; Jay P. Friedenson

[57] ABSTRACT

Polyamide and polyester fibers and molding compounds are rendered flame retardant by incorporation into the melt thereof of a complex salt of a polyvalent metal and a hydroxycarboxylic acid, preferably also with boric acid. Preferred complex salts include the subgallates, borocitrates and borotartrates of antimony, aluminum and the alkaline earth metals. The fibers may be tufted to form flame retardant carpets.

55 Claims, No Drawings

FLAME RETARDANT FIBERS, CARPETS AND MOLDING COMPOUNDS AND METHODS OF MAKING SAME

BACKGROUND OF THE INVENTION

Agents imparting flame retardant properties have been developed for polyamide and polyester fibers, molding compounds, carpets and other polyamide and polyester materials. Such agents frequently include a halogen-containing ingredient, which may render the material unsuitable for certain applications because of smoke formation, toxicity of various types or various other properties. Among the most common flame retardant materials are antimony oxide and antimony chloride.

Metal salts of hydroxycarboxylic acids have been suggested for use as a component for flame retardant compositions in U.S. Pat. No. 3,956,236 of F. E. Evans et al. in combination with certain organic acids or their ammonium salts, particularly hydroxycarboxylic acids or their ammonium salts. Also, U.S. Pat. No. 3,943,100 to M. B. Berenbaum et al. describes flame retardants based on certain organic acids, e.g., gallic acid, citric acid, or tartaric acid, or the ammonium, lithium or magnesium salts thereof. Although these patents constitute a major contribution to this art, investigations have been continued to develop improved flame-retardant fibers and molding compounds.

BRIEF DESCRIPTION OF THE INVENTION

The present invention includes an improved method of forming polyamide and polyester fibers which are formed from a melt, which improvement comprises incorporating into the melt from about 0.5 to 5% by weight of melt of a complex salt selected from the group consisting of antimony, aluminum and alkaline earth subgallates, borocitrates and borotartrates.

The present invention also includes an improved polyamide or polyester fiber which is the product of the improved method of the invention.

The present invention also includes an improved carpet having a relatively pliable primary backing and a tufted surface, said surface being comprised of the improved fibers of the invention.

The present invention also includes an improved method of forming polyamide and polyester molding compounds which are formed from a melt, which improvement comprises incorporating into the melt from about 0.5 to about 10.0% by weight of melt of a complex salt selected from the group consisting of antimony, aluminum and alkaline earth metal subgallates, borocitrates and borotartrates.

DETAILED DESCRIPTION OF THE INVENTION

In the description of the invention, the term borocitrates is intended to include both the complex salt and substantially equimolar mixtures of boric acid and a metal citrate salt that form the complex salt in situ at some point in the method of forming fibers or molding compound.

Similarly, the term borotartrates is meant to include mixtures of boric acid and a metal tartrate that form the complex salt in situ. As described above, the present invention includes an improved method of forming polyamide or polyester fibers which are formed from a melt, which improvement comprises incorporating into the melt from about 0.5 to about 10% by weight of a complex salt. One group of complex salts are the antimony, aluminum and alkaline earth metal subgallates. By this is meant complex salts of antimony, aluminum, berillium, barium, magnesium or higher alkaline earth metals with gallic acid and oxy or hydroxy substituents. The preferred material is antimony subgallate, which is a known compound having been described by Takagi and Nagase in Vol. 56 of J. Pharm. Soc. page 175 (1936) abstracted in Vol. 30 of *Chemical Abstracts,* page 4840 (1936).

Another suitable group of complex salts are the antimony, aluminum and alkaline earth metal borocitrates. These are salts of antimony, aluminum, beryllium, barium, calcium, magnesium and higher alkaline earth metals with the complex acid borocitric acid formed by the combination of boric acid and citric acid. Borocitric acid is a known material, having been described by Trasad and Singh in J. Indian Chem. Soc., Vol. 44, Number 3, page 219 (1967). Preferred materials include the antimony borocitrate, the aluminum borocitrate, the magnesium borocitrate and the barium borocitrate. The antimony borocitrate is most preferred. This group also includes mixtures of boric acid and citrates such as antimony hydrogen citrate.

A third suitable group of complex salts are the antimony, aluminum and alkaline earth borotartrates. These are salts of antimony, aluminum, beryllium, barium, calcium, magnesium and higher alkaline earth metals with the complex acid borotartric acid formed by the combination of boric and tartaric acids. Borotartric acid is a known material being described by S. Prasad and N. P. Singh in J. Indian Chem. Soc'y, Vol. 44, No. 3, page 219 (1967). Preferred materials include the antimony, aluminum, magnesium and barium borotartrates, with antimony borotartrate being most preferred. This group also includes mixtures of boric acid with metal tartrates such as antimony hydrogen tartrate.

The same three groups of complex salts, including preferred and most preferred materials, are intended to be used in the other aspects of the invention, including the method of forming molding compounds, the flame retardant fibers and the flame retardant carpets of the present invention.

The melt from which the fibers, carpets and molding compounds are prepared may be polyamide or polyester materials. The term polyamide is intended to include polymers of amino acids and particularly polycaproamide (a polymer of caprolactam). The term polyamide is also intended to include polymers of dicarboxylic acids with diamines such as polymers of adipic acid with hexamethylene diamine. It will be appreciated that these polyamide materials are conventionally referred to as nylon, with polycaproamide referred to as nylon-6 and the poly(adipic acid-hexamethylene diamine) material referred to as nylon-66. Related nylon-type compounds, including homologs of nylon-6 and nylon-66 are within the scope with the present invention. However, the preferred polyamide is polycaproamide.

By polyesters, it is intended to include polymers of a dicarboxylic acid and a polyol and especially a diol (commonly referred to as a glycol). The polyol may have 2-20 carbons, but preferrably is aliphatic with 2-5 carbons. The dicarboxylic acid may have 2-20 carbons, but is preferrably at least predominately an aromatic dicarboxylic acid. More preferred dicarboxylic acids include those which are predominantly (at least about 75%) of an isomer of phthalic acid or anhydride, and especially terephthalic acid or anhydride. Thus, the most preferred materials include poly(ethylene terephthalate), poly(propylene terephthalate) and poly(butylene terephthalate), as well as polymers of ethylene, propylene and butylene glycol with dicarboxylic acid materials which are at least about 75% terephthalic acid and up to about 25% of other dicarboxylic acids such as isophthalic acid and adipic acid.

The complex salt may be incorporated into the melt by a variety of techniques, including adding the material to the kettle in which the melt is formed. However, it is preferred that the melt, as it is withdrawn from the kettle and extruded into fibers or particles of molding compounds, be coextruded with the complex salt forming material. It is known in the formation of both fibers and molding compounds to coextrude various additives with the melt. The choice of suitable methods from among known techniques would be apparent to one skilled in the art using routine experimentation. The complex salt may be coextruded with melt only, or coextruded with the melt and other materials such as fillers. The material may then be spun into yarn or cut up into pellets of molding compound as is conventional. The fibers may then be tufted into a primary backing of jute or the like as is conventional, and a secondary backing applied using a latex adhesive or other such conventional material, to form a carpet.

The complex salts of the present invention impart flame retardancy to the polyamide or polyester at levels of about 0.5 to about 10.0% by weight of melt. In such small quantities, the complex salt does not materially detract from the viscosity or other physical properties of the melt or the product fiber or molding compound, nor does it detract from the colorability or dyeability of the product.

EXAMPLE 1

Preparation of Subgallates and Borocitrites

Antimony subgallate is prepared by the method of Takagi and Nagase as follows:

10 Grams of antimony potassium tartrate were dissolved in about 200 cc's of boiling water. 6.0 grams of gallic acid were dissolved in about 100 cc's of boiling water. The second solution was added slowly to the first, with constant stirring, with both solutions kept hot. The combined solution was then removed from the heat, but still stirred, and allowed to cool to 40°–50° C. It was then filtered and the filtrate washed with boiling water to remove soluble materials. It was then dried in an air circulating oven at 105° C. overnight and stored in a dessicator until used.

Borocitric acid is prepared by the method of Prasad and Singh as follows:

In about 400 grams of distilled water were dissolved 19.2 grams of citric acid and 6.2 grams of boric acid to form borocitric acid in solution. To prepare water insoluble salts, this solution was neutralized with 12.0 grams of sodium hydroxide and stirred for about 30 minutes. A stoichiometric amount of antimony trichloride was then added in small quantities with constant stirring to form the water insoluble antimony borocitrate. The reaction mixture was then heated to near boiling and stirred at this elevated temperature for about 30 minutes. After cooling, the liquid was filtered and the filtrate washed free of water-soluble salts with distilled water. It was then dried at 125° C. overnight and then stored in a dessicator until used.

The same procedure may be followed for other borocitrate salts.

EXAMPLE 2

A melt was prepared of polycaproamide (called nylon-6) which was coextruded with 2.0% by weight of antimony subgallate prepared according to Example 1 and formed into carpet yarn. The fibers were then tufted onto a "Typar" primary backing (a jute material) material and a jute secondary backing was applied with a binder of styrene butadiene latex containing aluminum trihydrate. Some of the carpets were further backed with a heavy underlayment of rubberized jute-hair.

EXAMPLE 3 — Flame Spread

A methenamine pill was ignited on the carpet samples of Example 1 and the flame spread measured according to the Radiant Panel Test described under "Proposed Criteria for Use" in "Critical Radiant Flux Test" by I. A. Benjamin and C. H. Adams in National Bureau of Standards I.R. 75–90 (December 1975). The flame spread was 33 cm for the carpet without underlayment and 66 cm for the carpet with underlayment. The burn time was 32.8 minutes for the carpet without underlayment, 66 cm for the carpet with underlayment. Similarly prepared carpets with nylon-6 fibers without the animony subgallate showed flame spread of 50 cm without underlayment and 80 cm with underlayment.

EXAMPLE 4

The carpet samples of Example 2 were subjected to a Flooring Radiant Panel Test referenced in Example 3. The critical heat flux (in watt/cm$^2$) was determined to be 0.633 without underlayment 0.21 with underlayment. Similar values for carpets prepared without antimony subgallate coextruded with the melt were 0.35 without underlayment and 0.15 with underlayment.

EXAMPLE 5

The carpet samples of Example 2 were subjected to the Aggrivated Pill Test described in our copending application Ser. No. 727,072 which description is incorporated herein by reference. Initially, the carpet (without underlayment) passed the test at 203° C. surface temperature (marginally) and at 197° C. and failed the test at 220° C. These results mean that, for example, when the carpet was heated by infra red light to a surface temperature of 203° C., and a methenamine pill was lit on the surface, the maximum burn diameter of 5 cm, or flame continued for 3 minutes or longer, when the surface temperature was 220° C., but did not surpass either of these limits when the surface temperature was 197° C. When the surface temperature was 203° C., the carpet just passed these criteria.

After 3 AATCC-124-1973 launderings, the carpets passed at 204° C. After 5 such launderings, they passed at 205° and failed at 212° C. After 10 such launderings, they passed at 204° C. Control carpets without antimony subgallate coextruded with the nylon-6 passed at 152° C. initially, but failed at 166° C. After 5 and 10 AATC-124-1073 laundering, the control carpets passed at 149° C. and 137° C., respectively, but failed at 157° C. and 155° C., respectively. Thus it can be seen that the carpets of the present invention show about a 50° C. increase in flame retardancy according to this test, both initially and after repeated launderings.

EXAMPLE 6

Examples 2 and 4 were repeated using nylon-6 coextruded with 4.5% antimony subgallate by weight. The critical radiant flux (in watt/cm$^2$) was 0.817 without underlayment and 0.305 with underlayment. At a level of 4.5% by weight, the yarn was somewhat discolored and dull, but considered acceptable. At higher levels, such as 6%, serious viscosity changes in the melt and discoloration of the yarn were observed.

EXAMPLES 7-20

Example 2 is repeated by coextruding with the melts indicated in Table 1, the indicated complex salt forming materials at the levels indicated in Table 1. All such fibers show good flame retardancy when incorporated into carpets.

Table 1

| Ex. | Melt | Material | Level (weight % of melt) |
|---|---|---|---|
| 6 | Nylon-6 | Antimony subgallate | 0.5 |
| 7 | Nylon-6 | Aluminum subgallate | 8.0 |
| 8 | Nylon-6 | Magnesium subgallate | 6.0 |
| 9 | Nylon-6 | Barium subgallate | 5.0 |
| 10 | Nylon-6 | Antimony borotartrate | 5.0 |
| 11 | Nylon-6 | Antimony borocitrate | 7.0 |
| 12 | Nylon-6 | Aluminum borocitrate | 7.0 |
| 13 | Nylon-66 | Magnesium borocitrate | 7.0 |
| 14 | Nylon-6 | Barium borocitrate | 10.0 |
| 15 | Nylon-66 | Calcium borocitrate | 9.0 |
| 16 | Nylon-66 | Beryllium borocitrate | 9.0 |
| 17 | Poly(ethylene terephthalate) | Antimony subgallate | 6.0 |
| 18 | Poly(butylene terephthalate) | Antimony borocitrate | 10.0 |
| 19 | Ethylene glycol polymer with 90% terephthalate and 10% adipate | Antimony citrate Boric acid | 7.0 1.7 |
| 20 | Nylon-6 | Antimony tartrate Boric acid | 7.0 1.0 |

EXAMPLE 21

Examples 2 and 6–20 are repeated except that the coextruded melt is cut into particles of molding compound. These particles may optionally be combined with a filler or other conventional additive to molding compounds either during extrusion or afterwards.

What is claimed is:

1. In a method of forming polyamide or polyester fibers which are formed from a melt, the improvement which comprises incorporating into the melt from about 0.5 to about 10% by weight of melt of a complex salt selected from the group consisting of antimony, aluminum and alkaline earth metal subgallates, borocitrates and borotartrates.

2. The method of claim 1 wherein said complex salt is an antimony, aluminum or alkaline earth metal subgallate.

3. The method of claim 2 wherein said complex salt is antimony subgallate.

4. The method of claim 1 wherein said complex salt is an antimony, aluminum or alkaline earth metal borocitrate.

5. The method of claim 4 wherein said complex salt is antimony borocitrate.

6. The method of claim 4 wherein said complex salt is aluminum borocitrate.

7. The method of claim 4 wherein said complex salt is magnesium borocitrate.

8. The method of claim 4 wherein said complex salt is barium borocitrate.

9. The method of claim 1 wherein said complex salt is antimony, aluminum or alkaline earth metal borotartrate.

10. The method of claim 9 wherein said complex salt is antimony borotartrate.

11. The method of claim 1 wherein said fibers are polyamide fibers.

12. The method of claim 11 wherein said fibers are polycaproamide fibers.

13. The method of claim 1 wherein said fibers are polyester fibers.

14. A polyester or polyamide fiber prepared by the method of claim 1.

15. A polyester or polyamide fiber prepared by the method of claim 2.

16. A polyester or polyamide fiber prepared by the method of claim 3.

17. A polyester or polyamide fiber prepared by the method of claim 4.

18. A polyester or polyamide fiber prepared by the method of claim 5.

19. A polyester or polyamide fiber prepared by the method of claim 6.

20. A polyester or polyamide fiber prepared by the method of claim 7.

21. A polyester or polyamide fiber prepared by the method of claim 8.

22. A polyester or polyamide fiber prepared by the method of claim 9.

23. A polyester or polyamide fiber prepared by the method of claim 10.

24. A polyamide fiber prepared by the method of claim 11.

25. A polycapramide fiber prepared by the method of claim 12.

26. A polyester fiber prepared by the method of claim 13.

27. A carpet having a relatively pliable primary backing and a tufted surface, said surface being comprised of fibers prepared by the method of claim 1.

28. A carpet having a relatively pliable primary backing and a tufted surface, said surface being comprised of fibers prepared by the method of claim 2.

29. A carpet having a relatively pliable primary backing and a tufted surface, said surface being comprised of fibers prepared by the method of claim 3.

30. A carpet having a relatively pliable primary backing and a tufted surface, said surface being comprised of fibers prepared by the method of claim 4.

31. A carpet having a relatively pliable primary backing and a tufted surface, said surface being comprised of fibers prepared by the method of claim 5.

32. A carpet having a relatively pliable primary backing and a tufted surface, said surface being comprised of fibers prepared by the method of claim 6.

33. A carpet having a relatively pliable primary backing and a tufted surface, said surface being comprised of fibers prepared by the method of claim 7.

34. A carpet having a relatively pliable primary backing and a tufted surface, said surface being comprised of fibers prepared by the method of claim 8.

35. A carpet having a relatively pliable primary backing and a tufted surface, said surface being comprised of fibers prepared by the method of claim 9.

36. A carpet having a relatively pliable primary backing and a tufted surface, said surface being comprised of fibers prepared by the method of claim 10.

37. A carpet having a relatively pliable primary backing and a tufted surface, said surface being comprised of fibers prepared by the method of claim 11.

38. A carpet having a relatively pliable primary backing and a tufted surface, said surface being comprised of fibers prepared by the method of claim 12.

39. A carpet having a relatively pliable primary backing and a tufted surface, said surface being comprised of fibers prepared by the method of claim 13.

40. In a method of forming polyamide and polyester moulding compounds which are formed from a melt, the improvement which comprises incorporating into the melt from about 0.5 to about 10% by weight of melt of a complex salt selected from the group consisting of antimony, aluminum and alkaline earth metal subgallates, borocitrates and borotartrates.

41. The method of claim 40 wherein said complex salt is an antimony, aluminum or alkaline earth metal subgallate.

42. The method of claim 41 wherein said complex salt is antimony subgallate.

43. The method of claim 40 wherein said complex salt is an antimony, aluminum or alkaline earth metal borocitrate.

44. The method of claim 43 wherein said complex salt is antimony borocitrate.

45. The method of claim 43 wherein said complex salt is aluminum borocitrate.

46. The method of claim 43 wherein said complex salt is magnesium borocitrate.

47. The method of claim 43 wherein said complex salt is barium borocitrate.

48. The method of claim 43 wherein said complex salt is an antimony, aluminum or alkaline earth metal borotartrate.

49. The method of claim 48 wherein said complex salt is antimony borotartrate.

50. The method of claim 40 wherein said melt is a polyamide.

51. The method of claim 50 wherein said melt is polycaproamide.

52. The method of claim 40 wherein said melt is a polyester.

53. The method of claim 52 wherein said melt is poly(ethylene terephthalate).

54. The method of claim 1 wherein said complex salt is coextruded with said melt.

55. The method of claim 40 wherein said complex salt is coextruded with said melt.

* * * * *